United States Patent Office 3,837,993
Patented Sept. 24, 1974

3,837,993
ADHESION OF TEXTILES TO RUBBER
Robert M. Shimmel, Southgate, Mich., assignor to
Uniroyal, Inc., New York, N.Y.
No Drawing. Filed May 3, 1972, Ser. No. 249,853
Int. Cl. D03d 25/00
U.S. Cl. 161—92
10 Claims

ABSTRACT OF THE DISCLOSURE

Incorporation of trimethylene trisulfone in rubber stock increases the adhesion to textiles.

---

This invention relates to a method of adhering textiles to rubber, a laminate resulting from such method and a rubber stock useful in such method.

In certain rubber articles designed to withstand considerable stress in use the rubber is reinforced with plies of comparatively inextensible materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure.

In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex "solutioning" composition preferably contains a resin, e.g., a fusible partially reacted resorcinol-formaldehyde resin, such as a condensate of resorcinol and formaldehyde in the ratio of 1 mole of resorcinol to about 0.5 to 0.8 mole of formaldehyde, and formaldehyde or a formaldehyde-yielding agent which on subsequent heating (as during vulcanization of the rubber intermediate the textile plies) cures the fusible resin to an infusible state. According to one aspect of the present invention, there is obtained a further improvement in adhesion of the textile material to the rubber intermediate the textile plies in addition to that obtained by the latex "solutioning" treatment of the textile material.

In carrying out the present invention, adhesion of the textile material to the rubber layers intermediate the textile plies is greatly improved by incorporating in the solid rubber intermediate the textile plies trimethylene trisulfone, which is a six membered cyclic organic compound comprising alternating methylene (—CH$_2$—) and sulfone (—SO$_2$—) groups according to the following formula:

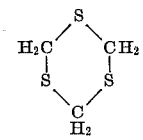

Along with the trimethylene trisulfone, which will hereinafter usually be referred to as "TMTS" for the sake of convenience and brevity, the solid rubber typically further contains a methylene acceptor, preferably a resorcinol type methylene acceptor. The resorcinol type methylene acceptors present in the rubber stock along with the TMTS include: resorcinol or other meta disubstituted benzene in which each of the substituents is an OH, NH$_2$ or OCOCH$_3$ radical (e.g., m-aminophenol, m-phenylene-diamine, resorcinol monoacetate, resorcinol diacetate), or 1,5-naphthalenediol, or a fusible partially reacted resorcinol-carbonyl compound (having from 1 to 6 carbon atoms) resin, such as resorcinol-formaldehyde resin (condensate of resorcinol and formaldehyde in the ratio of one mole of resorcinol to about 0.5 to 0.8 mole of formaldehyde), or a condensation product of resorcinol and acetone (condensate of resorcinol and acetone in the ratio of one mole of resorcinol to about 0.5 to 2 moles of acetone), or a condensation product of resorcinol and acetaldehyde (condensate of resorcinol and acetaldehyde in the ratio of one mole of resorcinol to about 0.5 to 1 mole of acetaldehyde), or a condensation product of resorcinol and formaldehyde and butyraldehyde. Such fusible partially reacted resorcinol-formaldehyde resins and those used in the above mentioned latex "solutioning" compositions may be prepared in known manner by heating a concentrated aqueous solution of the resorcinol and formaldehyde, with or without a catalyst such as oxalic acid. The ball and ring softening point (ASTM Designation E28–58T) of such fusible partially reacted resins will generally be from about 60° C. to 120° C. Such resorcinol-acetone condensates, which are white powders, may be prepared in known manner by reacting the acetone and resorcinol in dilute hydrochloric acid solution at temperatures from 35° C. to 50° C. for several hours. Such resorcinol-acetaldehyde condensates, which are tacky reddish oils, may be prepared in known manner by reacting the acetaldehyde and resorcinol in dilute oxalic acid solution at 100° C., for several hours. (See U.S. Pat. 3,503,845, Hollatz et al., Mar. 31, 1970.)

The TMTS itself is a known chemical, and may be prepared by the permanganate oxidation of s-trithiane:

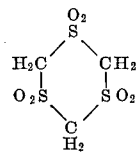

The TMTS and the resorcinol type methylene acceptor react on heating, as in the vulcanization of the rubber, to form an infusible resin.

The rubber intermediate the textile plies may be applied in the usual manner by calendering a coating of a solid vulcanizable rubber composition containing the resin forming components of the invention, viz, the TMTS and resorcinol type methylene acceptor, on the textile material, generally on both sides, e.g., as in the conventional coating of tire cord fabric with tire carcass stock. The two ingredients (TMTS and resorcinol type methylene acceptor) may be mixed with the conventional compounding ingredients in the solid rubber in a Banbury mixer and the rubber composition then calendered on the textile material. After building the rubber-coated textile material into the finished article, e.g., a tire, the assembly is heated to vulcanize the rubber components thereof. The ratio of the TMTS to the resorcinol-type methylene acceptor may vary for example from 0.3:1 or less to 4:1 or more. The optimum amount depends on the stoichiometry of the particular components employed and is best ascertained empirically for each system. The amount of the ingredients mixed with the rubber is not critical. Generally 0.5 or less to 4 parts or more, and preferably 1 to 3 parts, of TMTS and resorcinol-type methylene acceptor (total) per 100 parts of the rubber will be mixed in the rubber compound to be calendered on the textile material.

The solid rubber used in the present invention for making the rubber and fabric laminates for use in tire manufacture and for other purposes may be sulfur vulcanizable natural (Hevea) rubber or conjugated diolefin polymer synthetic rubber or mixtures of any of them including their reclaims.

The aqueous dispersion of rubber, when used for "solutioning" the textile material before plying with the solid rubber composition, may be natural rubber latex, or a latex of conjugated diolefin polymer synthetic rubber, or mixtures thereof, or an aqueous dispersion of reclaim from such rubbers, or mixtures of any such latices and reclaim dispersions.

Such conjugated diolefin polymer synthetic rubbers are polymers of butadienes-1,3, e.g., butadiene-1,3, isoprene, 2,3-dimethylbutadiene-1,3, and copolymers of mixtures thereof, and copolymers of mixtures of one or more such butadienes-1,3 with one or more other polymerizable compounds which are capable of forming rubbery copolymers with butadienes-1,3, for example, up to 60% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of such compounds which contain a $CH_2=C<$ group and are copolymerizable with butadienes-1,3 are aryl olefins, such as styrene, vinyl toluene, alpha-methylstyrene, chlorostyrene, dichlorostyrene, vinyl napthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine, methyl vinyl ketone. Examples of such conjugated diolefin polymer synthetic rubbers are: polybutadiene (whether of high cis content or otherwise), polyisoprene (whether natural or synthetic), butadiene-styrene copolymers (SBR; whether solution-prepared or emulsion-prepared) and butadiene-acrylonitrile copolymers.

The rubber intermediate the plies will also contain conventional compounding and vulcanizing ingredients such as carbon black, silica, or other filler, rubber processing or softening oil which may be added as such or may be present from oil-extended rubber, antioxidant, sulfur or sulfur-donating curative, zinc oxide and accelerator of sulfur vulcanization.

The textile material may comprise cords or woven fabrics. In the preferred form of the invention the textile material adhered to the rubber stock is polyester fiber. Any polyester fibers known to the art to be useful for reinforcing rubber can be used in the invention. Typically the polyester is a "linear terephthalate polyester" as that term is defined in U.S. Pat. 3,051,212, Daniels, Aug. 28, 1962. Examples of such polyester fibers are those described in the Daniels patent and in U.S. Pat. 3,216,187, Chantry et al., Nov. 9, 1965. The invention is not limited to using fibers of the type described in those patents but can use any polyesters including those described, for example, in U.S. Pat. 2,465,319, Whinfield et al., Mar. 22, 1949, and the best-known commercial example is polyethylene terephthalate, which will be used in the examples to illustrate the invention. Another example is polyethylene terephthalate-isophthalate copolymer.

In the form of the invention in which the textile material is polyester fiber, optimum results are obtained by first conditioning the polyester by pre-dipping in a composition, hereinafter defined, prior to the conventional "solutioning" treatment described above. A single or double dip may be used. The conditioning of the polyester fiber is frequently accomplished by passing the textile material through an aqueous dispersion of an epoxy resin and a blocked isocyanate.

The epoxy resins which may be used have a molecular weight between 200 and 2,000, are liquids at the finishing temperatures, are insoluble in water, and have an epoxide equivalent between about 130 and 1,000. An example of such resin is Epon Resin 812 (Shell Chemical Company), a mixture of di- and tri-epoxides prepared by the condensation of epichlorohydrin and glycerine. This material has an epoxide functionality of 2.2, about 10% tightly bound chlorine, an average molecular weight of about 306, an equivalent weight (g. resin to esterify one mole of acid) of 65, and a viscosity at 25° C. of 0.9–1.5 poise. Others include those derived from bisphenol A, e.g., Epon 1002, Epon 1004 (Shell Chemical Company), and Araldite 6084 (Ciba Co.); epoxylated novalaks, e.g., Kopox 955A and Kopox 997A which have molecular weight of 885 and 1270, respectively (Koppers Co.).

The blocked isocyanate must form the isocyanate group at the finishing temperatures. The blocking group, which is most commonly a phenol, but which may also be a caprolactam, serves to prevent reaction with water. The isocyanates are at least difunctional and have a molecular weight between 100 and 500. Examples of such materials are: the bisphenol adduct of methylene bis (4-phenol isocyanate) having a molecular weight of 439 and sold as "Hylene" MP (Du Pont), the bisphenol adduct of m-phenylene diisocyanate; and the bis-caprolactam adduct of toluene-2,4-diisocyanate sold as "Hylene" T (Du Pont). The isocyanate may be self-blocked, that is, it may be a diisocyanate dimer. An example of a suitable diisocyanate dimer is the dimer of methylene bis (4-phenylisocyanate); also Bayer "Desmodure TT" which is the dimer of toluene diisocyanate. Such dimers have a uretidienedione structure (U.S. Pat. 3,307,966, Shoaf, Mar. 7, 1967).

The following table sets forth the broad and preferred conventional ranges of the components in the pre-dip.

TABLE A

| | Percent in aqueous dispersion | |
|---|---|---|
| | Broadly | Preferred |
| Epoxy resin | 0.7–3 | 1.3–1 |
| Isocyanate | 1.4–7 | 2.7–4 |
| Percent solids | 2–10 | 4–6 |

Conventional amounts of surfactants are also present. In practice, the polyisocyanate is admixed with water in the presence of a surfactant to form a slurry. Thereafter the slurry is admixed with additional water and the epoxy resin.

Dipping is most conveniently performed at room temperature. Where a double dip is used the first dip pick up is about ½% solids. In either the single or double dip the total solid in the solution is about 8%, broadly from 3 to 8%.

After the polyester fiber is dipped it is dried at a temperature of from 375 to 480° F., preferably from 390 to 450° F., for a period of one-half to six minutes, preferably one to three minutes. The dried pre-dipped fiber is thereafter "solutioned" in the conventional latex cord solution. After heating the finally "solutioned" polyester cord at elevated temperature it is laminated to the rubber stock of the invention containing the TMTS and methylene acceptor (resorcinol type compound) as described above. Vulcanization of the laminate produces the desired adhesive bond.

It is a particular advantage of the invention that the adhesive system of the invention has remarkably good aging characteristics, especially in the case of polyester tire cord fabrics. The adhesion actually appears to "reinforce" or improve upon aging. This is reflected in longer service life, and freedom from premature failure, particularly under adverse conditions, such as use at high speed or under heavy loads, of pneumatic tires reinforced with polyester cords adhered in accordance with the invention.

Furthermore, stocks containing TMTS cure well to provide good physical properties.

The following examples, in which all quantities are expressed by weight unless otherwise indicated, will serve to illustrate the practice of the invention in more detail.

EXAMPLE 1

A rubber tire carcass stock is prepared by mixing 35 parts of natural rubber, 20 parts of high cis-polybutadiene rubber, 67.5 parts of oil-extended styrene-butadiene rubber (45 parts of SBR containing 23% styrene and 22.5 parts of naphthenic petroleum hydrocarbon extender oil), 52.5 parts of carbon black, 10 parts of zinc oxide, 3 parts of petroleum hydrocarbon processing oil, 1 part of stearic acid, 0.5 part of antioxidant ("Betanox Special"—R.P. of phenyl-beta-naphthylamine and acetone), 0.75 part of a commercial fusible partially reacted resorcinol-formaldehyde resin (ratio of one mole of resorcinol to about 0.6 to 0.8 mole of formaldehyde) having a ball and ring softening point of about 110° C., 2.5 parts of TMTS (trimethylene trisulfone, the adhesive chemical of the invention), 1.3 parts of benzothiazole disulfide, 0.25 part of diphenyl guanidine and 3 parts of sulfur.

Polyester tire cord (Dacron T-68, 840/2) is pre-dipped in a solution prepared by mixing 334.8 parts of an isocyanate slurry with 1302.56 parts of water and 17.08 parts of epoxy resin (Epon Resin 812). The isocyanate slurry is prepared by admixing 426 parts of water with 9 parts of sodium dioctyl sulfosuccinate (dispersing agent) and 100 parts of a phenol-blocked isocyanate (Hylene MP). The cord is dried at a temperature of 400° F. for 2 minutes and at 420° F. for 0.5 minute.

After the pre-dipped tire cord is dried it is dipped in a conventional resorcinol-formaldehyde vinyl pyridine latex cord solution. This "solutioning bath" consists of 20 parts solids of a latex of a terpolymer of 70 parts of butadiene with 15 parts of vinyl pyridine and 15 parts of styrene and 8 parts of a commercial partially reacted resorcinol-formaldehyde resin (ratio of one mole of resorcinol to about 0.6 to 0.8 mole of formaldehyde) having a ball and ring softening point of about 110° C., 0.5 part of ammonia and 2 parts of formaldehyde. The solutioned cord is dried at a temperature of 400° F. for 2 minutes.

The above-described rubber compound is calendered onto the treated polyester cord and the laminate is cured for 45 minutes at 293° F. to provide test specimens for use in the H-adhesion test [India Rubber World, volume 114, page 213 (1946) "Study of the H Test for Evaluating the Adhesion Properties of Tire Cord in Natural Rubber and GR-S Rubber"; ASTM designation D2138–62T].

A typical H-adhesion value obtained at 250° F. is 27.9 pounds, compared with a typical value of 23.1 pounds obtained with an otherwise similar laminate made from a rubber compound from which the TMTS adhesive chemical of the invention has been omitted. After aging of the laminate for 4 hours at 300° F. in a metal bath, the H-adhesion value of the laminate of the invention is 21.5 pounds at 250° F., compared to 14.6 pounds in the laminate made without the TMTS.

EXAMPLE 2

In this example, the practice of the invention with rayon tire cord is illustrated. The "solutioning" bath for rayon consists of 80 parts solids of a copolymer of 50 parts of butadiene and 50 parts of styrene, 20 parts solids of a latex of a terpolymer of 70 parts of butadiene and 15 parts of vinyl pyridine and 15 parts of styrene, 8 parts of a commercial partially reacted resorcinol-formaldehyde resin (ratio of 1 mole resorcinol to about 0.6 to 0.8 mole of formaldehyde) having a ball and ring softening point of about 110° C., 0.5 part of ammonia and 2 parts of formaldehyde, at a 15–20% concentration.

The TMTS-containing rubber compound employed is the same as that described in Example 1.

The rayon cord is solutioned with the described bath and dried at a temperature of 340° F. for 2 minutes. The cord pick-up is between 4 and 5%.

The rubber compound is calendered onto the treated rayon cord and the laminate is cured for 45 minutes at 293° F. to provide test specimens for use in the adhesion test. The laminates are subjected to the H-adhesion test as in Example 1. The "green" (unaged) H-adhesion value of the rayon cord to the stock of the invention is 12.2 pounds at 250° F. In an otherwise similar laminate, from which the TMTS has been omitted from the stock, the adhesion value is 12.1 pounds. However, after aging 4 hours at 325° F. in a metal bath the adhesion value for the rayon-rubber laminate of the invention is 14.6 pounds at 250° F., whereas the value for the laminate made without TMTS is only 11.7 pounds.

EXAMPLE 3

The following data demonstrate that stocks containing TMTS cure well to provide good physical properties. Comparison is made to a conventional methylene donor, trimethylolnitromethane (U.S. Pat. 3,503,845, Hollatz et al., Mar. 31, 1970). Two vulcanizable rubber stocks are prepared, one containing TMTS as in Example 1 and the other containing trimethylolnitromethane instead of TMTS. The stocks are cured at 293° F. for 45 minutes and the physical properties are determined, with the following results:

|  | Nitro-alcohol stock | TMTS stock |
|---|---|---|
| Modulus at 300%: |  |  |
| Elongation, p.s.i | 1,190 | 1,230 |
| Tensile strength, p.s.i | 2,300 | 2,350 |
| Elongation at break, percent | 535 | 520 |
| Scorch at 265° F., min | 13 | 12 |

Having thus described my invention, what I claim and desire to protect by Letters Patent is:

1. A laminate of textile material and a solid vulcanized rubber composition containing trimethylene trisulfone and a methylene acceptor, the ratio of trimethylene trisulfone to methylene acceptor being from 0.3:1 to 4:1 by weight and the amount of trimethylene trisulfone plus methylene acceptor being from 0.5 to 4 parts, per 100 parts by weight of rubber.

2. A laminate of textile material and a calendered vulcanized rubber composition containing the resinous reaction product of trimethylene trisulfone and a methylene acceptor, the ratio of trimethylene trisulfone to methylene acceptor being from 0.3:1 to 4:1 by weight and the amount of trimethylene trisulfone plus methylene acceptor being from 1 to 3 parts, per 100 parts by weight of rubber.

3. A laminate of textile material and a calendered vulcanized rubber composition containing the resinous reaction product of trimethylene trisulfone and a resorcinol-type methylene acceptor, the ratio of trimethylene trisulfone to methylene acceptor being from 0.3:1 to 4:1 by weight and the amount of trimethylene trisulfone plus methylene acceptor being from 0.5 to 4 parts, per 100 parts by weight of rubber.

4. A laminate as in claim 3 wherein the resorcinol-type methylene acceptor is resorcinol, m-amino phenol, m-phenylene diamine, resorcinol monoacetate, resorcinol diacetate, 1,5-naphthalene diol or a partially reacted resorcinol-carbonyl compound wherein the carbonyl component has 1 to 6 carbon atoms.

5. A laminate as in claim 3 in which the resorcinol-type methylene acceptor is a partially reacted resorcinol-formaldehyde resin.

6. A laminate as in claim 3 in which the textile material is rayon.

7. A laminate as in claim 3 in which the textile material is polyester.

8. A laminate of a polyester textile material containing the dried deposit of an epoxy resin and a blocked isocyanate and a calendered vulcanized rubber composition containing the reaction product of trimethylene trisulfone and a resorcinol-type methylene acceptor, the ratio of trimethylene trisulfone to methylene acceptor being from 0.3:1 to 4:1 by weight and the amount of trimethylene trisulfone plus methylene acceptor being from 0.5 to 4 parts, per 100 parts by weight of rubber.

9. The laminate of claim 8 wherein the resorcinol-type methylene acceptor is a partially reacted resorcinol-formaldehyde resin.

10. A solid vulcanizable rubber composition containing trimethylene trisulfone and a resorcinol-type methylene acceptor, the ratio of trimethylene trisulfone to methylene acceptor being from 0.3:1 to 4:1 by weight and the amount of trimethylene trisulfone plus methylene acceptor being from 0.5 to 4 parts, per 100 parts by weight of rubber.

References Cited
UNITED STATES PATENTS
3,276,948  10/1966  Gallagher _____ 156—110 A GEORGE F. LESMES, Primary Examiner J. J. BELL, Assistant Examiner U.S. Cl. X.R.

152—358; 156—110 A, 110 MD; 161—144, 187, 231, 239; 260—79.5 B, 783, 54